UNITED STATES PATENT OFFICE.

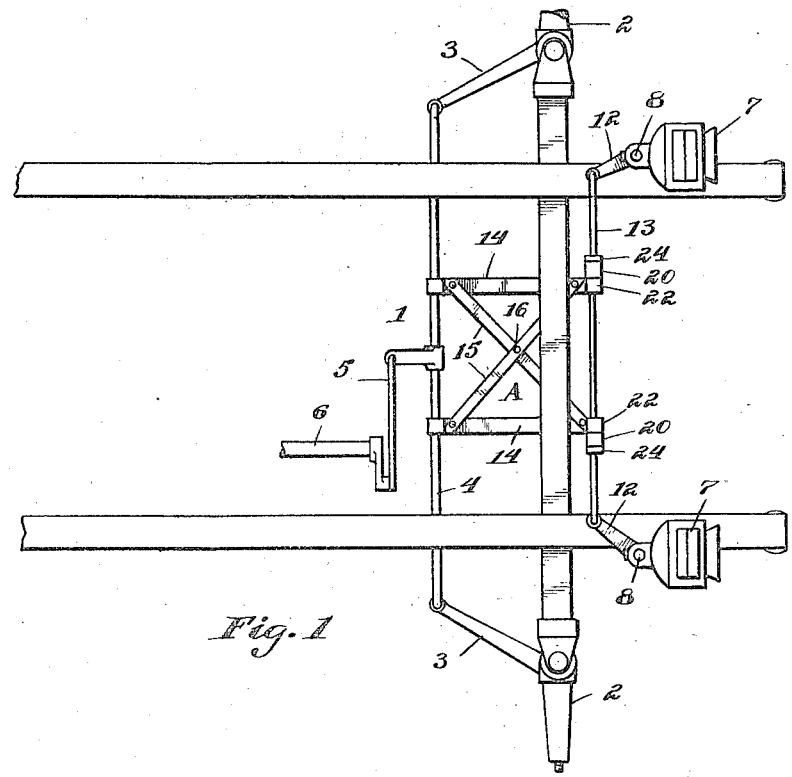
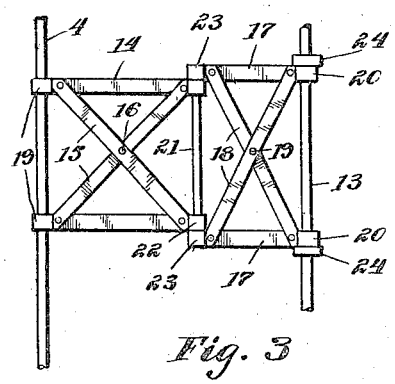
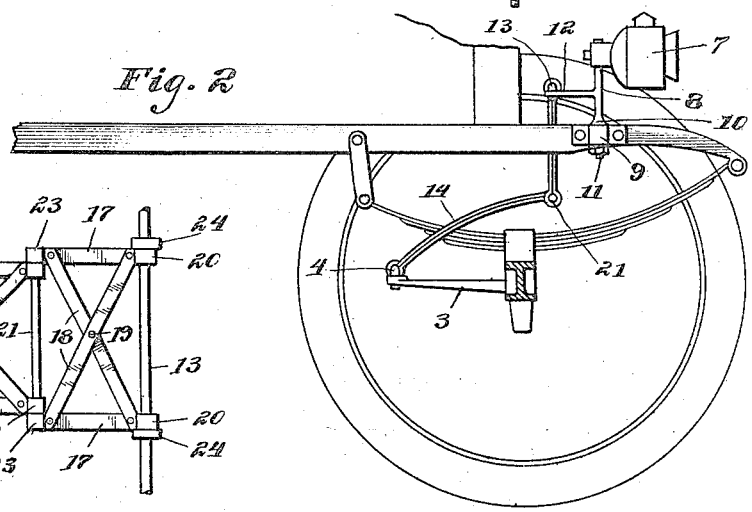

RICHARD J. SHAWHAN, OF KERSEY, COLORADO.

HEAD-LAMP CONTROL.

1,247,586.

Specification of Letters Patent.   Patented Nov. 20, 1917.

Application filed May 25, 1915. Serial No. 30,413.

*To all whom it may concern:*

Be it known that I, RICHARD J. SHAWHAN, a citizen of the United States, residing at Kersey, in the county of Weld and State of Colorado, have invented new and useful Improvements in Head-Lamp Controls, of which the following is a specification.

This invention relates to head lamp controls, the broad object of the invention being to provide simple mechanism whereby the head lamps of an automobile may be turned simultaneously with and in the same direction as the steering wheels of the machine so as to project the rays of light upon that portion of the road about to be followed by the machine in accordance with the angle to which the steering wheels are turned thus doing away with many of the accidents which now occur by reason of the fact that the road to be covered by the machine as a turn is made is not illuminated thus making it an easy matter for an operator to run into ditches, ruts, curbs or off embankments and the like. The device also minimizes the danger of collisions at cross roads, street crossings and various other places for the reason that the rays of light are shifted in the direction about to be taken by the car. Furthermore, the usual side lights are dispensed with and the head lights may be smaller thus cheapening the cost of manufacture of an automobile or similar vehicle, making two lights perform the work of four and also cutting down the lighting expense to the owner or operator of the machine.

With the above and other objects in view, the invention consists in the novel construction, combination and arrangement of parts, as herein described, illustrated and claimed.

In the accompanying drawings:—

Figure 1 is a plan view of a sufficient portion of an automobile to illustrate the application of the present invention thereto.

Fig. 2 is a side elevation of the same.

Fig. 3 is a plan view of the jointed yoke.

Referring to the drawings 1 designates the usual steering knuckles provided with the wheel spindles 2 for the steering wheels of the machine, 3 the knuckle arms and 4 the knuckle arm connecting rod yoking together the arms 3 so that when one of said arms is turned the other is correspondingly turned by means of the usual steering controls, shown in Fig. 1 as consisting partly of the steering rod 5 and steering arm 6.

In carrying out the present invention, each of the head lamps 7 is mounted fast on the upper end of a substantially vertical shaft 8 journaled in a bearing 9 secured to the frame of the car, said shaft being provided with a shoulder 10 resting against the top of the bearing 9 and a nut 11 threaded on the shaft 8 below the bearing 9 so as to take up wear and prevent the head lamp from rattling.

Each of the head lamps is provided with a turning arm 12 and these arms 12 are coupled together by means of a connecting rod 13 parallel to the rod 4. Where the arms 3 of the steering knuckles incline toward each other as shown in Fig. 1, the lamp turning arms 12 are correspondingly inclined toward each other so as not to interfere with the proper operation of the connecting rods 4 and 13.

The rods 4 and 13 are connected by means of a jointed yoke designated generally at A and comprising two sections, the rear section embodying substantially parallel side bars 14 connected by cross braces 15 fastened together at 16. The forward section is shown as also comprising parallel side bars 17 connected together by cross braces 18 fastened together at 19. The arms 14 are provided with eyes 19 to receive the rod 4 and the arms 17 are provided with eyes 20 to receive the rod 13. The front and rear sections of the yoke are pivotally connected together by means of a hinge rod 21 which passes through eyes or knuckles 22 and 23 at the adjacent ends of the bars 14 and 17, respectively. Fixed stop collars 24 are arranged on the connecting rod 13 and may if desired be placed upon the rod 4 to prevent the yoke from shifting longitudinally of either of said rods.

From the foregoing description, taken in connection with the accompanying drawings, it will now be understood that the pivotally connected sections of the yoke allow for the relative up and down movements of the frame and axle of the machine, while insuring the lateral movement of the yoke when actuated by the connecting rod 14, in order that the connecting rod 13 may be simultaneously and equally moved in the direction of its length for turning the head lamps. The bars 14 and 17 are preferably formed of spring strips so that they may be easily flexed to accommodate the relative movement between the frame and axle of the machine and the bars 14 are preferably curved as shown in Fig. 2 so as to add to their resiliency and also to enable them to extend upwardly and forwardly over the axle designated at 25.

What I claim is:—

In headlight controlling mechanism, the combination of a pair of rectangular and resilient frame sections, one of which is normally curved and arched over the front axle and the other of which lies and works in a substantially vertical plane, each of said frame sections embodying parallel and resilient side bars, cross braces for each frame section fixedly united to each other and to said side bars, and means for coöperatively connecting said frame to the steering knuckle connecting rod of an automobile and to a lamp operating connecting rod.

In testimony whereof I affix my signature in presence of two witnesses.

RICHARD J. SHAWHAN.

Witnesses:
L. B. TUCKER,
V. M. SHEELEY.

Copies of this patent may be obtained for five cents each, by addressing the "Commissioner of Patents, Washington, D. C."